United States Patent
Prozzi et al.

(10) Patent No.: US 10,800,293 B2
(45) Date of Patent: Oct. 13, 2020

(54) MOVABLE VEHICLE MODULE SYSTEM

(71) Applicant: Ford Global Technologies, LLC, Dearborn, MI (US)

(72) Inventors: Anthony Prozzi, Menlo Park, CA (US); Tyler Carpenter, San Francisco, CA (US); Jeremy John Malick, Menlo Park, CA (US); John Galin, Milford, CT (US); Christopher Robert Westfall, San Francisco, CA (US); Andres Almeida Senatore, Mountain View, CA (US); Daniel Boccuccia, San Francisco, CA (US); Siddharthan Selvasekar, Livermore, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/145,450

(22) Filed: Sep. 28, 2018

(65) Prior Publication Data

US 2020/0055423 A1 Feb. 20, 2020

Related U.S. Application Data

(60) Provisional application No. 62/765,147, filed on Aug. 17, 2018.

(51) Int. Cl.
*B60N 2/02* (2006.01)
*B60N 2/06* (2006.01)
*B60N 2/856* (2018.01)
*B60N 2/015* (2006.01)
*B60N 2/30* (2006.01)

(52) U.S. Cl.
CPC ......... *B60N 2/062* (2013.01); *B60N 2/01516* (2013.01); *B60N 2/856* (2018.02); *B60N 2/307* (2013.01); *B60N 2/3034* (2013.01); *B60N 2002/0216* (2013.01); *B60N 2205/30* (2013.01)

(58) Field of Classification Search
CPC ....................... B60N 2/062; B60N 2002/0216
USPC .................... 296/65.11, 65.13; 248/429, 430
See application file for complete search history.

(56) References Cited

U.S. PATENT DOCUMENTS

| | | | | |
|---|---|---|---|---|
| 2,753,947 A | * | 7/1956 | Mach .................... | B60N 2/005 180/89.18 |
| 2,758,872 A | * | 8/1956 | Gerhard ................ | B60N 2/245 296/65.12 |
| 5,636,884 A | * | 6/1997 | Ladetto .................. | B60N 2/06 296/65.09 |
| 6,270,140 B1 | | 8/2001 | Opfer et al. | |
| 6,457,765 B1 | | 10/2002 | Bergquist et al. | |
| 6,572,172 B1 | * | 6/2003 | Ninomiya ............ | B60N 2/0232 296/65.07 |
| 6,692,051 B1 | * | 2/2004 | Cook .................... | B60N 2/062 296/190.01 |
| RE39,101 E | * | 5/2006 | Miyahara .................. | 296/65.03 |

(Continued)

*Primary Examiner* — Dennis H Pedder
(74) *Attorney, Agent, or Firm* — David L. Coppielle; Price Heneveld LLP

(57) ABSTRACT

A vehicle module system is disclosed. The system includes a track assembly operably coupled with a body of a vehicle. One or more modules may be removably and slidably coupled with the track assembly. The modules include base structure defining an attachment point. A rail feature is disposed along a bottom portion of the base structure. An attachment feature having a retainer for removably coupling to the attachment point to the base structure.

15 Claims, 10 Drawing Sheets

(56) References Cited

U.S. PATENT DOCUMENTS

| | | | |
|---|---|---|---|
| 7,341,302 B2 | 3/2008 | Slade | |
| 7,387,327 B2 * | 6/2008 | Tencer | B60N 2/062 280/751 |
| 8,152,231 B2 | 4/2012 | Larsen et al. | |
| 8,251,427 B2 * | 8/2012 | Lindsay | B60N 2/062 296/64 |
| 8,567,842 B2 * | 10/2013 | Line | B60N 2/062 296/65.01 |
| 9,994,130 B2 * | 6/2018 | Michels | B60N 2/14 |
| 2005/0230996 A1 * | 10/2005 | Toyota | B60N 2/062 296/65.11 |
| 2012/0032466 A1 * | 2/2012 | Line | B60N 2/062 296/65.12 |
| 2015/0151651 A1 * | 6/2015 | Stingle | B60N 2/062 296/65.11 |
| 2015/0314705 A1 * | 11/2015 | Suck | B60N 2/072 248/430 |
| 2016/0339807 A1 * | 11/2016 | Mizuno | B60N 2/0825 |
| 2017/0368964 A1 * | 12/2017 | Kim | B60N 2/0232 |

* cited by examiner

MOVABLE VEHICLE MODULE SYSTEM

CROSS-REFERENCE TO RELATED APPLICATION

This application claims priority to U.S. Provisional Application No. 62/765,147 filed Aug. 17, 2018, entitled "MOVABLE VEHICLE MODULE SYSTEM," the entire disclosure of which is hereby incorporated by reference herein.

FIELD OF THE INVENTION

The present disclosure generally relates to movable modules within a vehicle passenger compartment.

BACKGROUND OF THE INVENTION

Various features within a vehicle passenger compartment may be adjusted for occupant comfort. However, there is a need for reconfigurable and movable modules in vehicles that are capable of translation to various locations within the passenger compartment.

SUMMARY OF THE INVENTION

According to one aspect of the present disclosure, a vehicle module system is provided herein and includes a base structure defining an attachment point. A rail feature is disposed along a bottom portion of the base structure. An attachment feature has a retainer for removably coupling to the attachment point.

According to another aspect of the present disclosure, a vehicle module system is provided herein. The vehicle module system includes a base structure defining a first upper attachment point and a second peripheral attachment point. A rail feature is disposed along a bottom portion of the base structure. First and second attachment features are operably coupled and supported by the respective first and second attachment points.

According to yet another aspect of the present disclosure, a vehicle is disclosed. The vehicle includes a body defining a passenger compartment. A track assembly is operably coupled with the body and oriented in a latitudinal direction. One or more modules are removably and slidably coupled with the track assembly.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
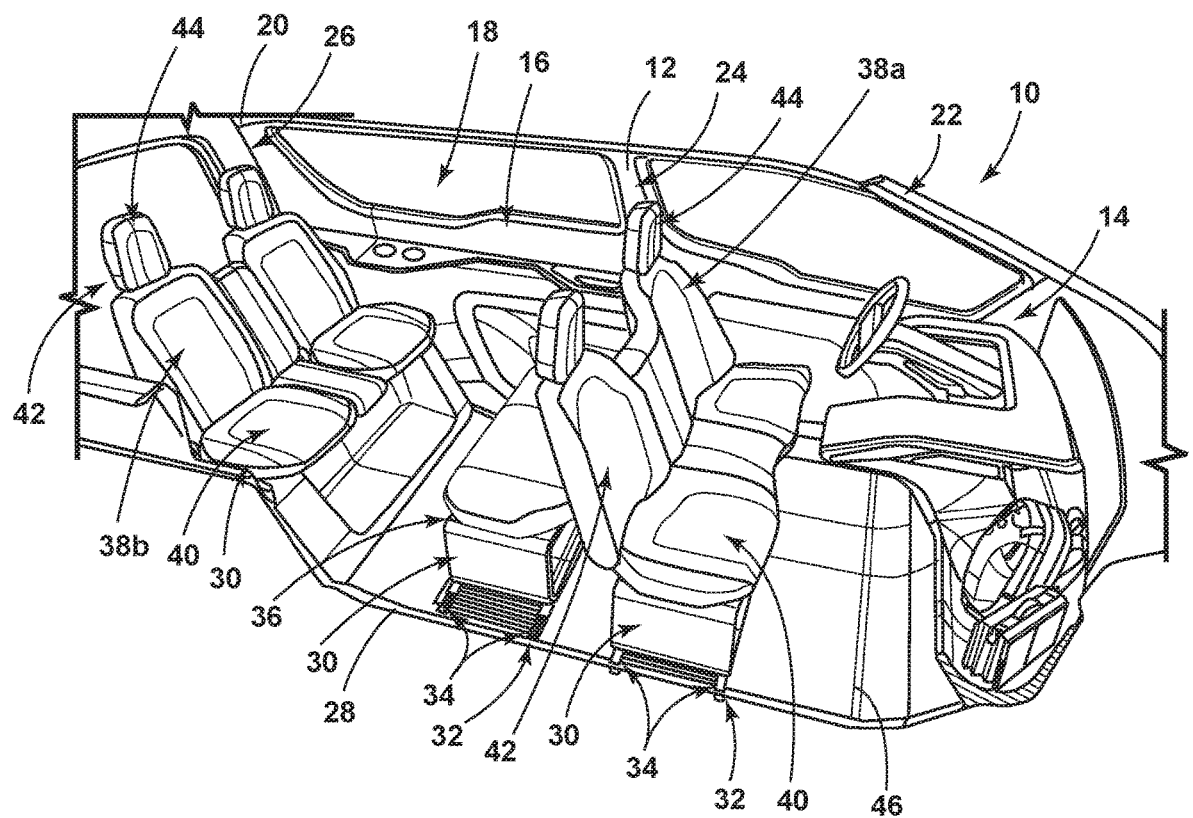
FIG. 1 is a side perspective view of a vehicle passenger compartment having a module system therein, the module system including a track assembly and one or more modules operably coupled with the track system, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle module system. The system includes a track assembly operably coupled with a body of a vehicle. One or more modules may be removably and slidably coupled with the track assembly. The modules include a base structure defining an attachment point. A rail feature is disposed along a bottom portion of the base structure. An attachment feature having a retainer for removably coupling to the attachment point is coupled to the base structure.

Referring to FIG. 1, a vehicle 10 includes a body 12 defining a passenger compartment 14. The body 12 generally includes one or more body panels 32, doors 16, windows 18, and a roof 20 that generally define a passenger compartment 14. One or more of the doors 16 may provide access to the passenger compartment 14 and/or a cargo compartment 42 and be aligned with a body opening. The vehicle body 12 may further include a plurality of pillars, including an A-pillar 22, a B-pillar 24, and a C-pillar 26. The pillars 22-26 support the roof 20 of the vehicle 10. A floor pan 28 defines the lower portion of the passenger compartment 14. The floor pan 28 is assembled to a frame rail of a vehicle 10 that may include a conventional frame. It should be understood that the frame may be a unibody frame that is integrally formed as part of the body 12 of the vehicle 10 or any other type of body 12 as well without departing from the teachings provided herein.

One or more modules 30 may be disposed within the passenger compartment 14 and operably coupled to a track assembly 32. The track assembly 32 includes one or more lateral rails 34 and/or one or more longitudinal rails 34 to facilitate the lateral and longitudinal movements of the one or more modules 30. Each of the lateral and/or longitudinal rails 34 may guide and/or support the one or more modules 30. The one or more modules 30 may be actuated along the track assembly 32 to assume a variety of configurations. The track assembly 32 within the passenger compartment 14 may be formed in any manner described in co-pending, commonly-assigned U.S. patent application Ser. No. 15/583,014, filed May 1, 2017, and entitled "SYSTEM TO AUTOMATE HITCHING A TRAILER," U.S. patent application Ser. No. 15/906,037, filed Feb. 27, 2018, and entitled "IN-FLOOR TRACK SYSTEM," U.S. patent application Ser. No. 15/871,341, filed Jan. 15, 2018, and entitled "VEHICLE SEATING ARRANGEMENT," U.S. patent application Ser. No. 15/871,354, filed Jan. 15, 2018, and entitled "RAIL SYSTEM FOR A VEHICLE," and/or U.S. patent application Ser. No. 15/725,841, filed Oct. 5, 2017, and entitled "VEHICLE SEATING ASSEMBLY," the entire disclosures of which are incorporated by reference herein.

Figure 15:
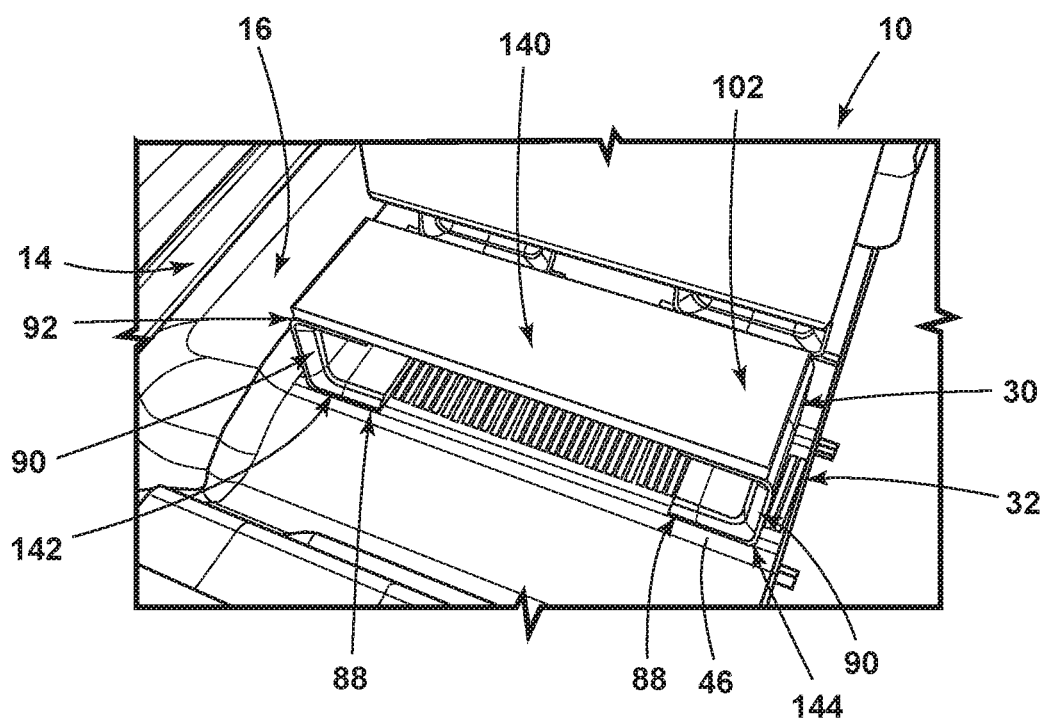
FIG. 15 is a top perspective view of an attachment feature extending over the two separated portions of the base structure, according to some examples.

The one or more modules 30 may be movable and positionable in various positions throughout the vehicle passenger compartment 14. The one or more modules 30 may be configured and/or used as a seat assembly, an ottoman 36, a bench 140 (FIG. 15), a table, a console, a storage assembly, a privacy wall, etc., for a variety of purposes including, but not limited to, providing adjustable seating arrangements within the vehicle 10, providing rear and/or forward facing seating, providing a privacy wall (FIG. 3) between two rows of seat bases 40, separating seat assemblies 38 from one another, providing various comfort furnishings/systems, providing additional storage arrangements, providing a work surface, and/or for any other purpose. For example, as illustrated in FIG. 1, an ottoman 36 may be disposed forwardly of a seat assembly. For example, the ottoman 36 may be disposed between a forwardly disposed seat assembly 38a and a rearwardly disposed seat assembly 38b. The ottoman 36 may be longitudinally and/or laterally adjustable along the track assembly 32.

The vehicle 10 may include one or more seat assemblies 38 having a seat base 40 and/or a seatback 42. The seat assembly 38 may be configured as a module 30 that is coupled to the track assembly 32 and/or attached to the vehicle 10 in any other manner. The seat base 40 and seatback 42 also include a cushion and an upholstery material disposed over the cushion substantially enclosing the seat base 40 and seatback 42, respectively. A headrest 44 may be removably and/or adjustably coupled with the upper portion of the seatback 42. In instances in which the seat assembly 38 is separated from the track assembly 32, the seat base 40 may be slidably coupled with a floor surface 46 of the vehicle 10 and/or a seat carrier 48 (FIG. 4) and may be adjusted in a forward and a rearward direction relative to the vehicle 10.

Figure 2:
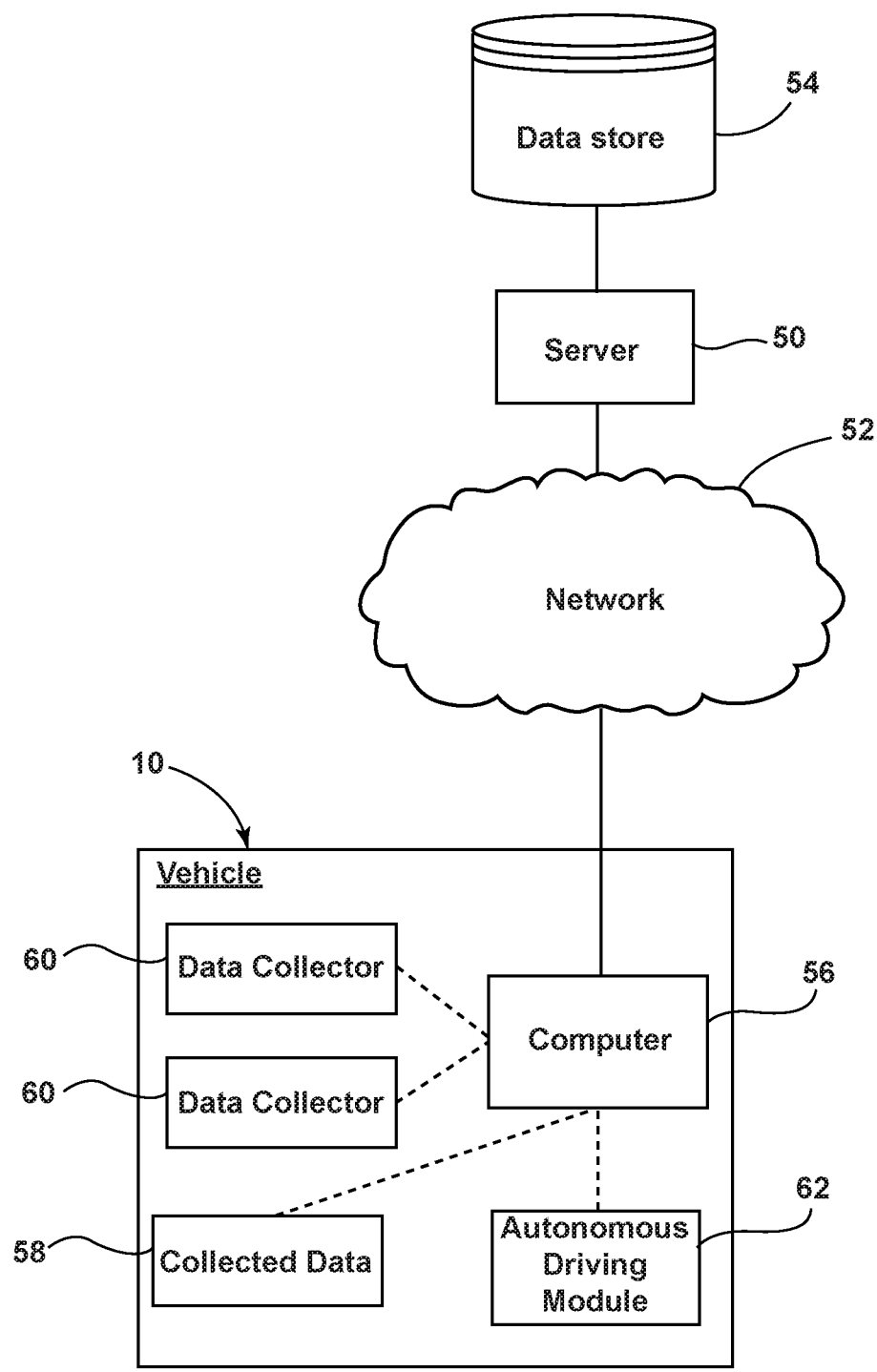
FIG. 2 is a block diagram of an exemplary autonomous vehicle system that may be employed by the vehicle, according to some examples.

Referring to FIG. 2, the vehicle 10 may be a manually operated vehicle (i.e. using a human driver) or may be autonomously driven by an onboard computer 56. Additionally, or alternatively, the vehicle 10 may be remotely controlled (e.g., via an operator located in a different location). In autonomous examples, one of which is exemplarily illustrated in FIG. 2, the computer 56 may be configured for communicating with one or more remote sites such as a server 50 via a network 52. The one or more remote sites may include a data store 54. The vehicle 10, including the computer 56, is configured to receive information, e.g., collected data 58, from one or more data collectors 60 related to various components of the vehicle 10, e.g., a steering wheel, brake pedal, accelerator pedal, gearshift lever, etc. The computer 56 generally includes an autonomous driving module 62 that includes instructions for autonomously, i.e., without some, or any, operator input, operating the vehicle 10, including possibly in response to instructions received from the server 50. Further, the computer 56, e.g., in the module 62, generally includes instructions for receiving data, e.g., from one or more data collectors 60, such as an interactive voice response (IVR) system, a graphical user interface (GUI) including a touchscreen or the like, etc.

By determining driver characteristics and/or vehicle operating conditions, the module 62 may determine an appropriate control or controls to be applied to one or more vehicle components. For example, the module 62 may determine whether and when a steering wheel should be moved to mimic or approximate vehicle steering being conducted as part of an autonomous driving operation, e.g., autonomous driving according to instructions from the server 50 and/or the module 62.

The vehicle computer 56 generally includes a controller having a processor and a memory, the memory including one or more forms of computer-readable media, and storing instructions executable by the processor for performing various operations. Further, the computer 56 may include more than one computing device, e.g., controllers or the like included in the vehicle 10 for monitoring and/or controlling various vehicle components, e.g., an engine control unit (ECU), transmission control unit (TCU), etc. The computer 56 may be generally configured for communications on a controller area network (CAN) bus or the like. The computer 56 may also have a connection to an onboard diagnostics connector (OBD-II). Via the CAN bus, the OBD-II, and/or other wired or wireless mechanisms, the computer 56 may transmit messages to various devices in the vehicle 10 and/or receive messages from the various devices, e.g., controllers, actuators, sensors, electronic devices, etc., including data collectors 60. In addition, the computer 56 may be configured for communicating with the network 52, which may include various wired and/or wireless networking technologies, e.g., cellular, Bluetooth, wired and/or wireless packet networks, etc.

Instructions may be stored in and executed by the computer 56 in the autonomous driving module 62. Using data received in the computer 56, e.g., from the data collectors 60, the server 50, etc., the module 62 may control various vehicle 10 components and/or operations without a driver to operate the vehicle 10. For example, the module 62 may be used to regulate vehicle speed, acceleration, deceleration, steering, operation of components such as lights, windshield wipers, etc. Further, the module 62 may include instructions for evaluating information received in the computer 56 relating to vehicle 10 operator characteristics, e.g., from the data collectors 60.

The data collectors 60 may include a variety of vehicle equipment. For example, various controllers in the vehicle 10 may operate as data collectors 60 to provide data 58 via the CAN bus, e.g., data 58 relating to vehicle speed, acceleration, etc. Further, sensors or the like, global positioning system (GPS) equipment, navigation systems, etc., could be included in the vehicle 10 and configured as data collectors 60 to provide data to the computer 56, e.g., via a wired or wireless connection. Sensor data collectors 60 could include mechanisms such as RADAR, LIDAR, sonar, etc. sensors that could be deployed to measure a distance between the vehicle 10 and other vehicles or objects. Yet other sensor data collectors 60 could include cameras, breathalyzers, motion detectors, etc., i.e., data collectors 60 to provide data for evaluating a condition or mode of a vehicle 10 operator. In addition, the data collectors 60 may include sensors to detect a position, change in position, rate of change in position, etc., of vehicle components such as a steering wheel, brake pedal, accelerator, gearshift lever, etc.

The memory of the computer 56 generally stores the collected data 58. The data 58 is generally collected using the one or more data collectors 60, and may additionally include data calculated therefrom in the computer 56, and/or at the server 50. In general, the collected data 58 may include any data that may be gathered by a collection device and/or computed from such data 58. For example, the collected data 58, as mentioned above, may include data concerning a position, change in position, rate of change in position, etc., of the vehicle 10 components such as a steering wheel, brake pedal, accelerator, gearshift lever, etc.

The network 52 represents one or more mechanisms by which a vehicle computer 56 may communicate with a remote server 50. Accordingly, the network 52 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 60 include wireless communication networks (e.g., using Bluetooth, IEEE 802.11, etc.), local area networks (LAN) and/or wide area networks (WAN), including the Internet, providing data communication services.

The server 50 may be one or more computer servers, each generally including at least one processor and at least one memory, the memory storing instructions executable by the processor, including instructions for carrying out various steps and processes. The server 50 may include or be communicatively coupled to a data store 54 for storing the collected data 58, as well as parameters for evaluating operator input, e.g., parameters for a specific vehicle operator, a specific vehicle 10, particular weather or other environmental conditions, etc. Further, the server 50 may store information related to multiple vehicles 10, traffic conditions, weather conditions, etc., within a geographic area, with respect to a particular road, city, etc. The server 50 could also be configured to provide drive-by-wire instructions to vehicles 10 in an autonomous driving area, e.g., a road, etc., such as an "all stop" instruction for all vehicles 10 to stop, a speed restriction, a lane restriction, etc.

Figure 3:
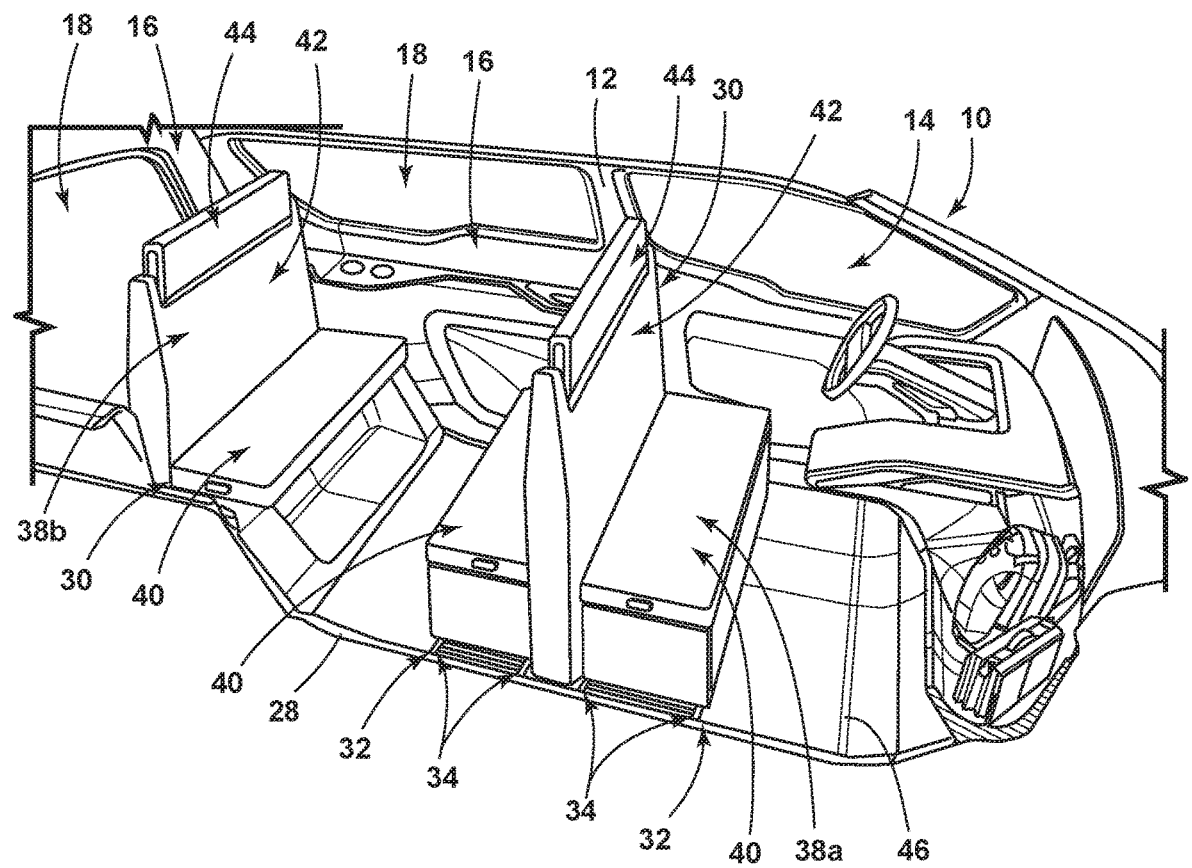
FIG. 3 is a side perspective view of the passenger compartment with a pair of modules disposed therein, according to some examples.

Referring now to FIG. 3, in some instances, one or more of the modules 30 may be configured as a seat assembly 38 having a common seatback 42 and a pair of seat bases 40 extending from opposing sides of the seatback 42. Moreover, an adjustable height headrest 44 may also extend from a top portion of the seatback 42 and be utilized by a user on either side of the seatback 42. In some instances, the seat assembly 38 may operably couple with a single rail 34 and extend forwardly and/or rearwardly of the single rail 34. In other instances, a large module 30, such as the seat assembly 38 exemplarily illustrated in FIG. 3, may be configured to operably couple with more than two rails 34. Accordingly, it will be appreciated that the modules 30 may be sized and/or formed for connecting with any number of rails 34 without departing from the teachings provided herein. Moreover, any module 30 may be operably coupled with any one or more track assemblies without departing from the scope of the present disclosure.

The one or more modules 30, which in FIG. 3 include a rearwardly positioned single direction seat assembly 38 and a two-sided seat assembly 38 disposed forwardly of the single direction seat assembly 38, may be removed by detaching each module 30 from a respective rail 34. In some instances, however, one or more areas of the vehicle 10 do not align with a vehicle opening and/or a door 16. In such situations, the modules 30 may include a second attachment feature and/or otherwise are coupled to the floor pan 28 and/or any other vehicle structure without departing from the teachings provided herein.

Figure 4:
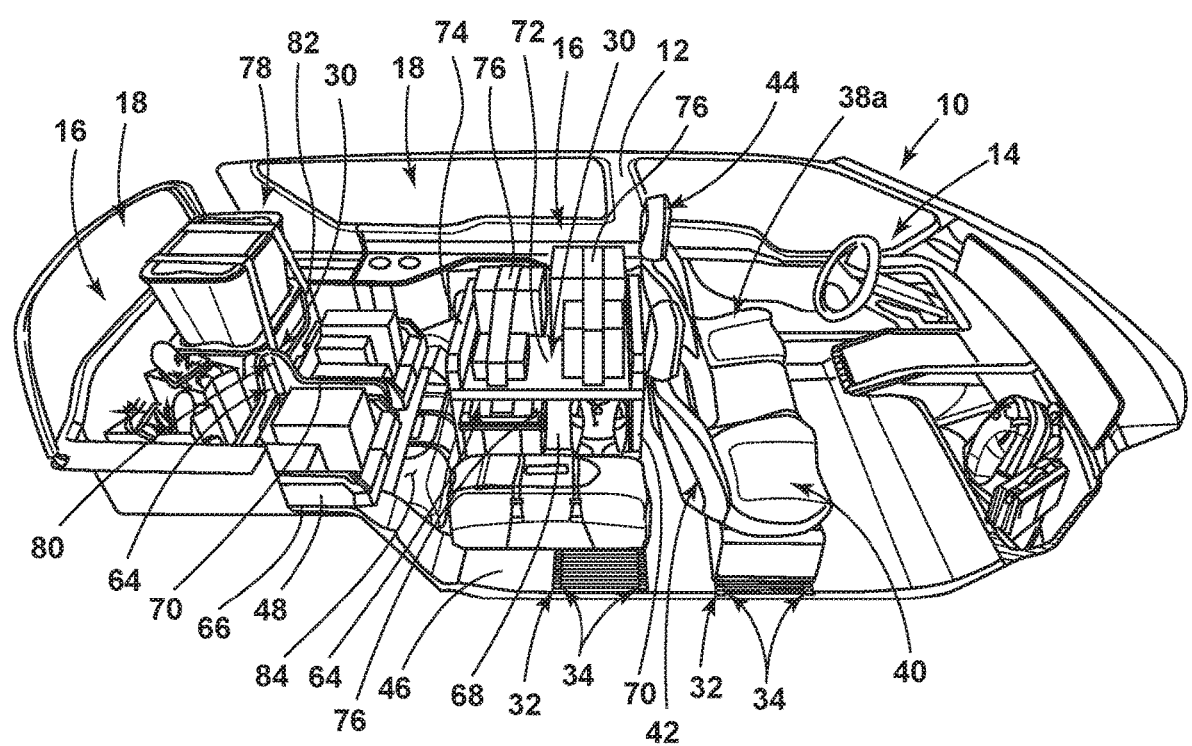
FIG. 4 is a top perspective view of the passenger compartment with a pair of modules configured as storage units, according to some examples.

Referring now to FIG. 4, in some examples, the one or more modules 30 may be configured as storage units 64 for variously sized packages. For instance, a storage unit 64 may be coupled to the track assembly 32 and disposed rearwardly of a pair of forwardly positioned seat assemblies 38. Additional storage units 64 may be operably coupled to a raised portion 66 of the floor surface 46. As illustrated, the storage unit 64 may define a base structure 68, upwardly extending walls 70, and possibly a top structure 72. Peripheral walls 74 may extend from the top structure 72. A storage area may be defined by the base structure 68, the upwardly extending walls 70, and when included, the top structure 72.

An additional storage area may be defined by the top structure 72 and the peripheral walls 74 extending upwardly therefrom. The base structure 68, upwardly extending walls 70, top structure 72, and/or peripheral walls 74 may be formed as an integral component or as separate components that are later attached to one another.

One or more retaining devices 76 may be operably coupled with the storage units 64 to maintain packages thereon. In some instances, the retaining devices 76 may be configured as straps that selectively retain the packages. In other examples, the retaining device 76 may be configured in any other manner to maintain the packages thereon while the vehicle 10 is stationary and/or in motion.

With further reference to FIG. 4, in some instances, various modules 30 may additionally and/or alternatively retainably couple with the seat carriers 48. When the seat assembly 38 is removed from the seat carrier 48, the seat carrier 48 may additionally define a storage area within the passenger compartment 14 and/or any other module 30 may be operably coupled to the seat carrier 48. As provided herein, the retaining device 76 may be operably coupled with the seat carrier 48 and configured to retain a package disposed therein and/or thereon.

Referring still to FIG. 4, the storage unit 64 may be disposed within a rear portion 78 of the passenger compartment 14 and define various sections. In some examples, upwardly extending and intersecting walls 80 may define four peripheral sections. A car forwardly extending wall 80 may be disposed between the seat carriers 48 and, possibly, operably coupled to a structure disposed proximate the seat carriers 48. Various portions, such as a proximal portion and/or a distal portion, of the walls 80 may extend upward of other portions, such as a central portion, of any of the walls 80. The raised portions 66 may have anchor apertures 82 thereon for fixing the retaining device 76 thereto. Additionally, the raised portions 66 may provide lateral support for a package disposed proximately thereto when the vehicle 10 is in motion. Each of the storage units 64 provided herein may be operably coupled with the track assembly 32 and/or any other vehicle structure for retention thereof. In some examples, the storage unit 64 may be disposed in a rear portion 78 of the passenger compartment 14 and operably coupled with a longitudinally extending rail 34. Accordingly, the storage unit 64 may be capable of sliding at least partially through the rear vehicle opening for providing additional access to items disposed within the storage unit 64.

With further reference to FIG. 4, in some examples, the floor pan 28 (FIG. 1), or other structure within the vehicle 10 may define an opening 84 beneath a seat carrier support structure. The seat carrier support structure may be integrally formed with the floor pan 28 and/or any other portion of the vehicle 10 and/or later attached thereto. In some instances, the shelf may be spaced apart from the seat carrier support structure to allow for movement of the module 30 along the track assembly 32 without contacting a package that may be disposed within the opening 84.

Figure 5:
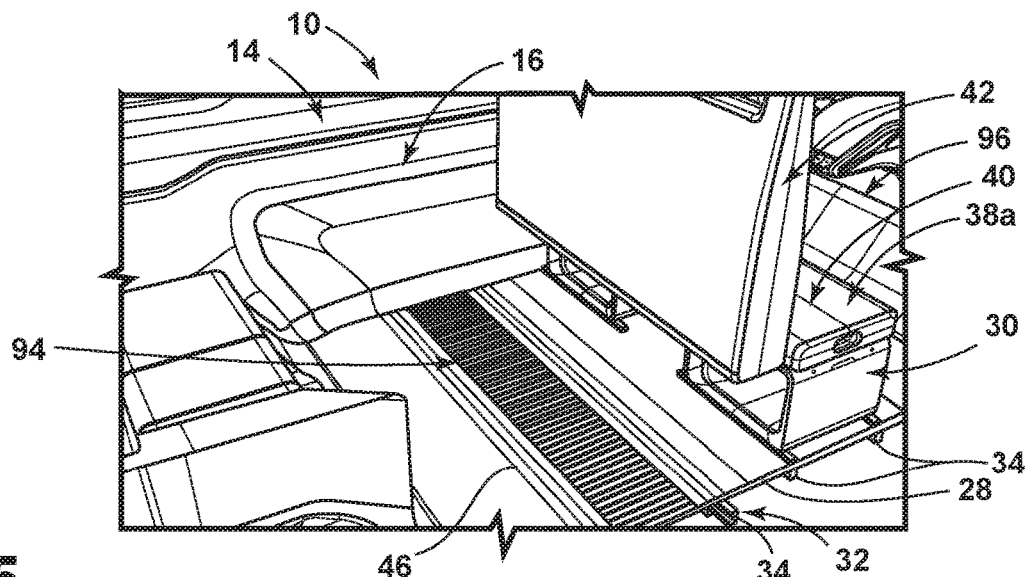
FIG. 5 is a side perspective view of the track assembly having a pair of rails and a guide disposed between the pair of rails, according to some examples.
Figure 6:
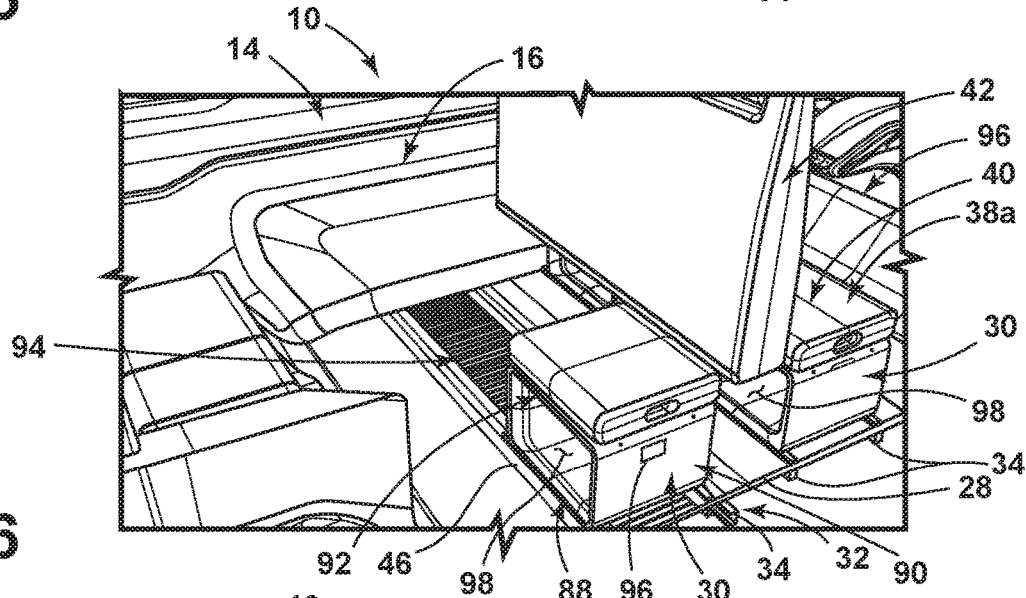
FIG. 6 is a side perspective view of the track assembly of FIG. 5 with the module disposed in a first passenger side position along the track assembly.
Figure 7:
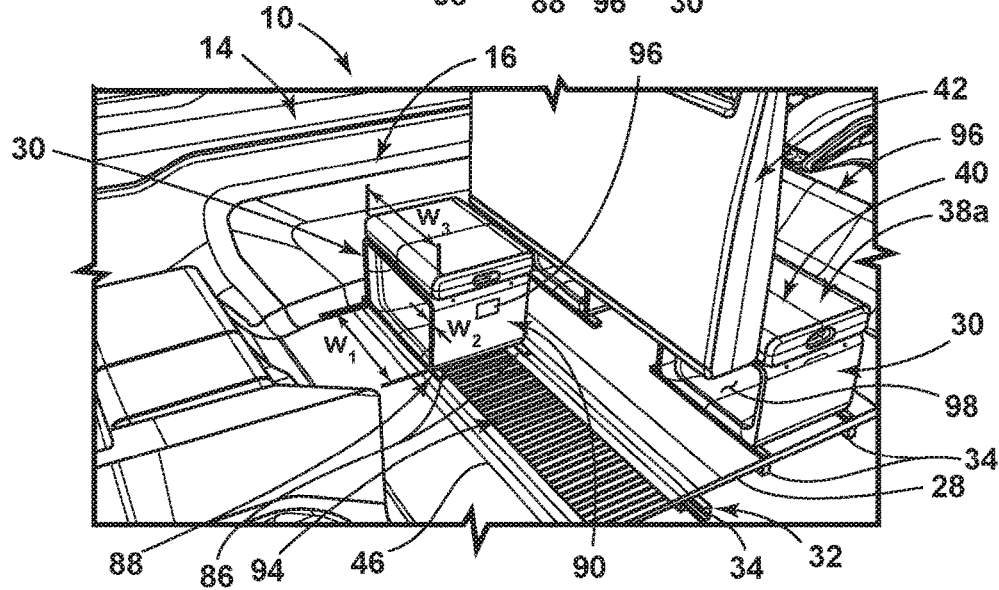
FIG. 7 is a side perspective view of the track assembly of FIG. 5 with the module disposed in a second, driver side position along the track assembly.

Referring to FIGS. 5-7, the track assembly 32 includes one or more lateral and/or longitudinal extending rails 34. Each rail 34 may be disposed below a floor surface 46 of the vehicle 10. The one or more modules 30 may be operably coupled with the rails 34. It will be appreciated that the track assembly 32 may be oriented in a longitudinal direction, a lateral direction, and/or any other orientation without departing from the scope of the present disclosure. In some examples, the rails 34 may be integrally formed with the floor pan 28.

The module 30 may include a base structure 68 having a rail feature 86 thereon. The rail feature 86 may couple with a bottom portion 88 of the base structure 68 that has a first width $w_1$. A central portion 90 of the base structure 68 may extend upwardly and have a second width $w_2$ that is less than the first width $w_1$. An upper portion 92 of the base structure 68 may be disposed on an opposing end portion of the central portion 90 from the bottom portion 88 and include a width $w_3$ that may also be larger than the width of the second portion. In some examples, a pair of central portions 90 may be disposed on opposing end portions of the bottom and upper portions 88, 92. Thus, the bottom portion 88, the pair of central portions 90, and the upper portion 92 may define a cavity therebetween. In some instances, the module 30 may be formed of first and second separable portions and each portion may include a central portion 90 and a bottom and/or upper portion 88, 92.

Figure 13:
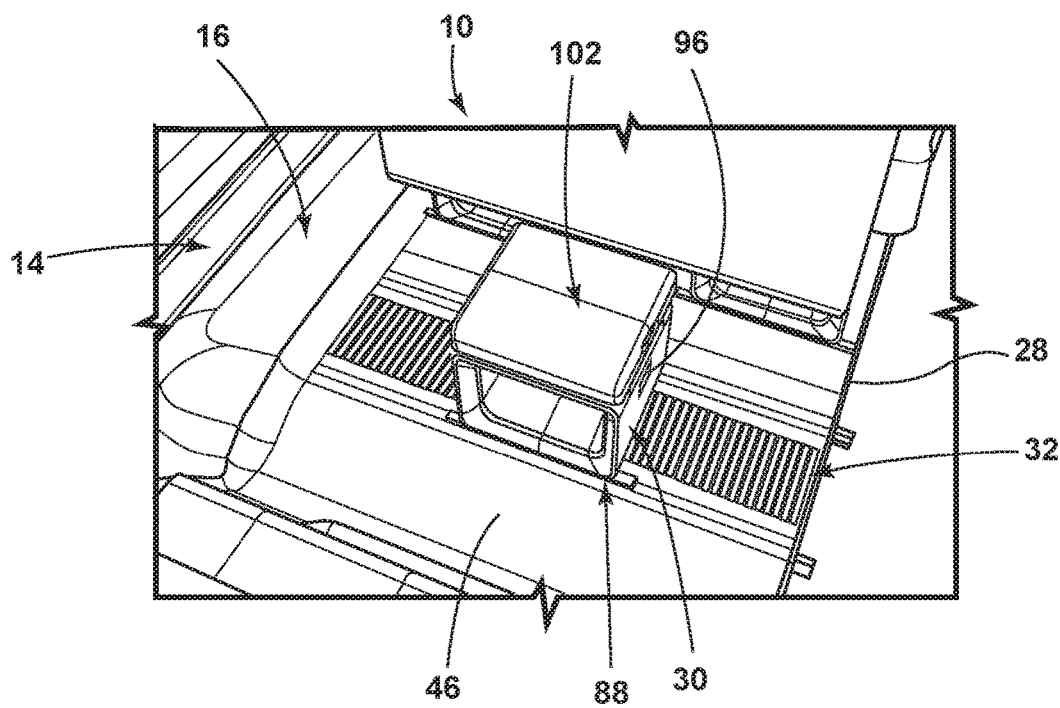
FIG. 13 is a side perspective view of the module operably coupled to the track assembly and the attachment feature disposed on the base structure, according to some examples.
Figure 14:
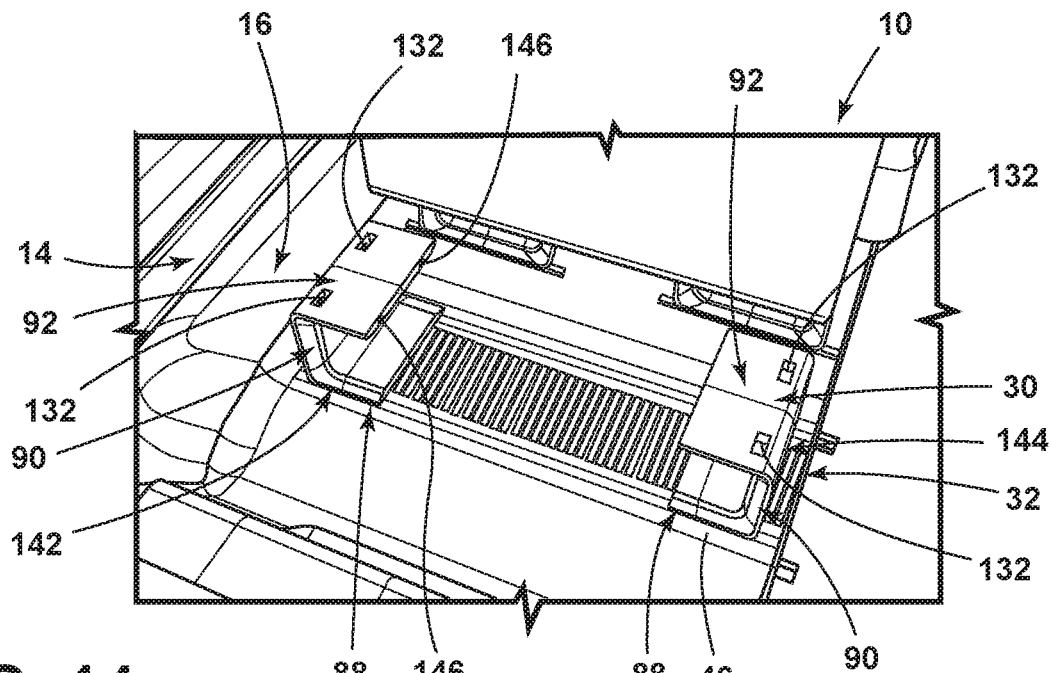
FIG. 14 is a top perspective view of the base structure having two separated portions each operably coupled with the track assembly, according to some examples.

A guide 94 may be disposed between the track assemblies, and may be configured in a rack configuration having raised and lower portions. In some instances, the base structure 68 may include a pinion that engages the guide 94. Moreover, the base structure 68 may include a latch 96 that is configured to retain and release the base structure 68 in a substantially fixed position. In the locked position, the latch 96 may contact the guide 94 for selective retainment thereof. Moreover, by including a plurality of teeth, the base structure 68 may be disposed in predetermined locations within the passenger compartment 14 as the latch 96 may be disposed between the teeth. By aligning the modules 30 in predetermined locations, the modules 30 coupled with various tracks within the passenger compartment 14 may be aligned to create larger storage spaces. For example, when a base structure 68 in a front portion of the passenger compartment 14 is aligned with a base structure 68 in a central portion of the passenger compartment 14, the respective cavities 98 defined by each base structure 68 may be aligned and form a larger space for storing items. As another example, as illustrated in FIG. 13, one module 30 is disposed rearward of two other modules 30, with the rearward module 30 being positioned latitudinally between the forward modules 30. In other words, in that illustrated example, the forward modules 30 have latitudinal positions that are closer to the sides of the vehicle 10 than the rearward module 30, which has a latitudinal position closer to the middle of the vehicle 10.

Figure 8:
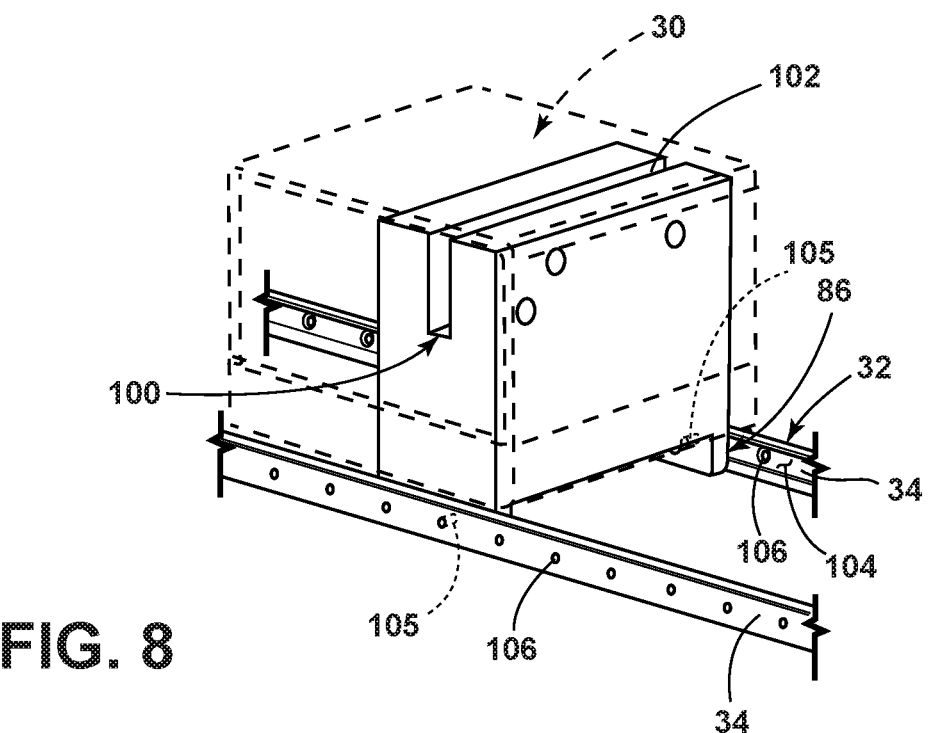
FIG. 8 is a side perspective view of a first frame of the module operably coupled with the pair of rails, according to some examples.
Figure 9:
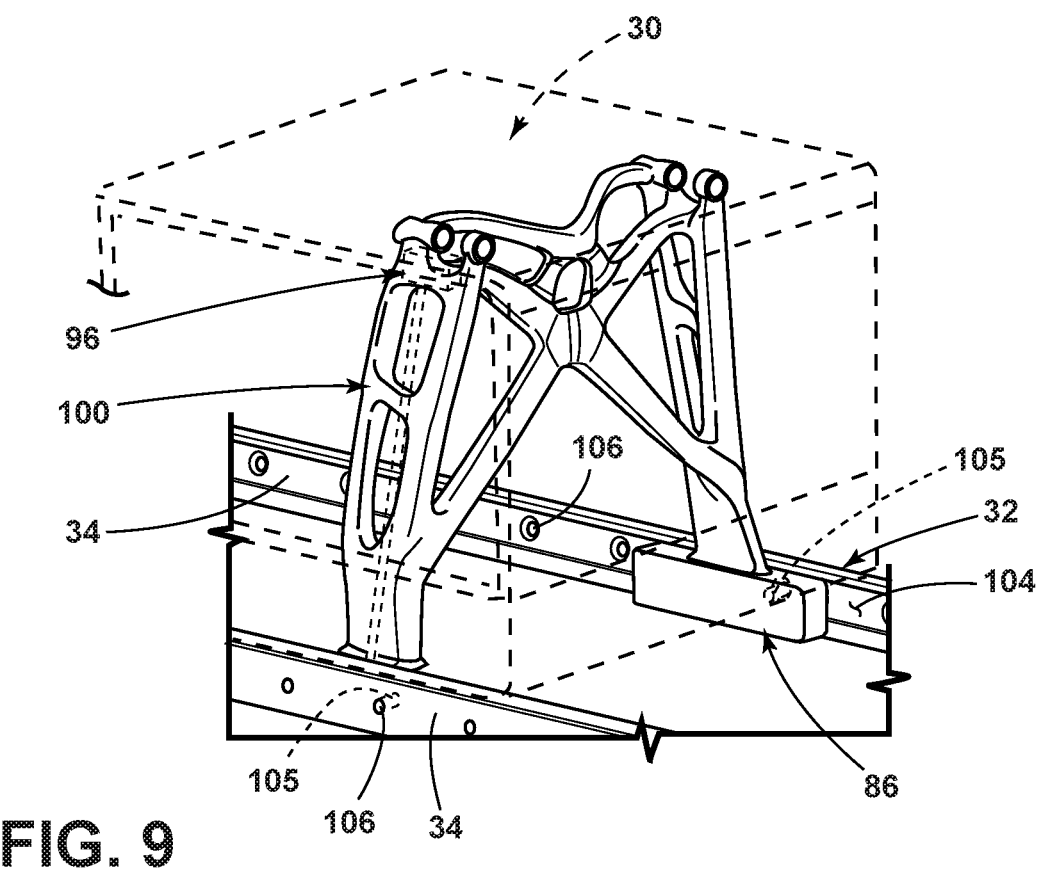
FIG. 9 is a side perspective view of a second frame of the module operably coupled with the pair of rails, according to some examples.

With reference to FIGS. 8 and 9, the base structure 68 may include a frame 100 therein and/or the frame 100 may be integrally formed with the base structure 68. The frame 100 may have a lower portion that is configured to interact with the rails 34 of the track assembly 32. For example, as illustrated in FIG. 8, the frame 100 may have a rectangular profile and define a slot 102 therein. One or more attachment features 104 may be coupled with the base structure 68 and accepted within the slot 102 for selective retainment thereof. As illustrated in FIG. 9, the frame 100 may include a pair of vertical portions and a cross-linked central portion extending between the two vertical portions.

The frame 100 may be formed from any material including, but not limited to, a metallic material, a polymeric material, an elastomeric material, combinations thereof, and/or any other practicable material. Similarly, the base structure 68 may be formed from any material including, but not limited to, a metallic material, a polymeric material, an elastomeric material, combinations thereof, and/or any other practicable material. The base structure 68 may have any geometry without departing from the scope of the present disclosure.

The rails 34 may define a channel 105 and the rail feature 86 may have at least a portion thereof disposed within the channel 105. The rails 34 may be equipped with a plurality of locking pin apertures 106 that is configured to receive a locking pin 108 (FIG. 11) of the latch 96. The locking pin 108 may pass through rail feature 86 to engage with the locking pin apertures 106. The locking pin 108 may be actuated in a horizontal and/or a vertical direction without departing from the scope of the present disclosure.

Figure 10:
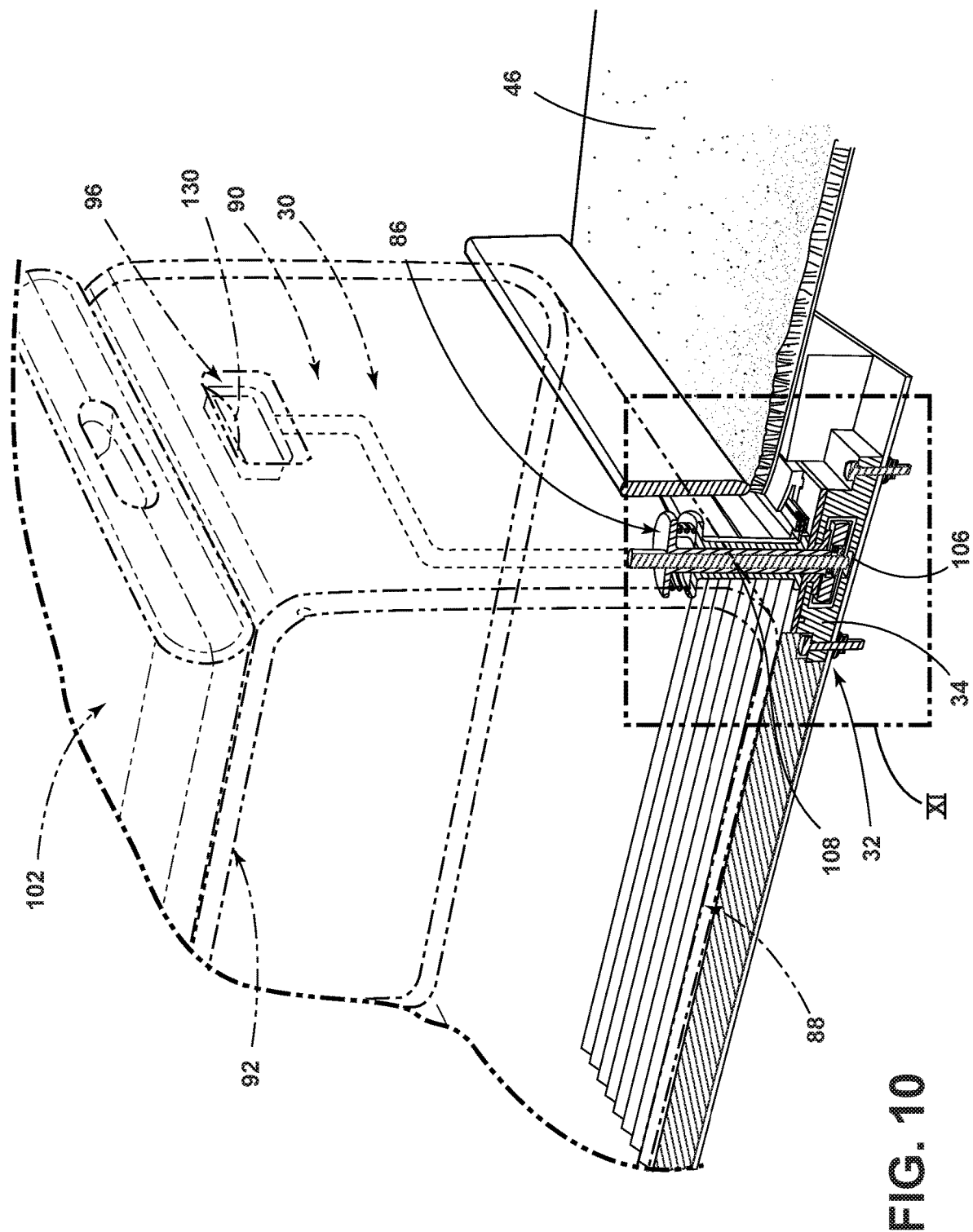
FIG. 10 is a front perspective view of the base structure operably coupled with a latch for retaining the module along the rail assembly.
Figure 11:
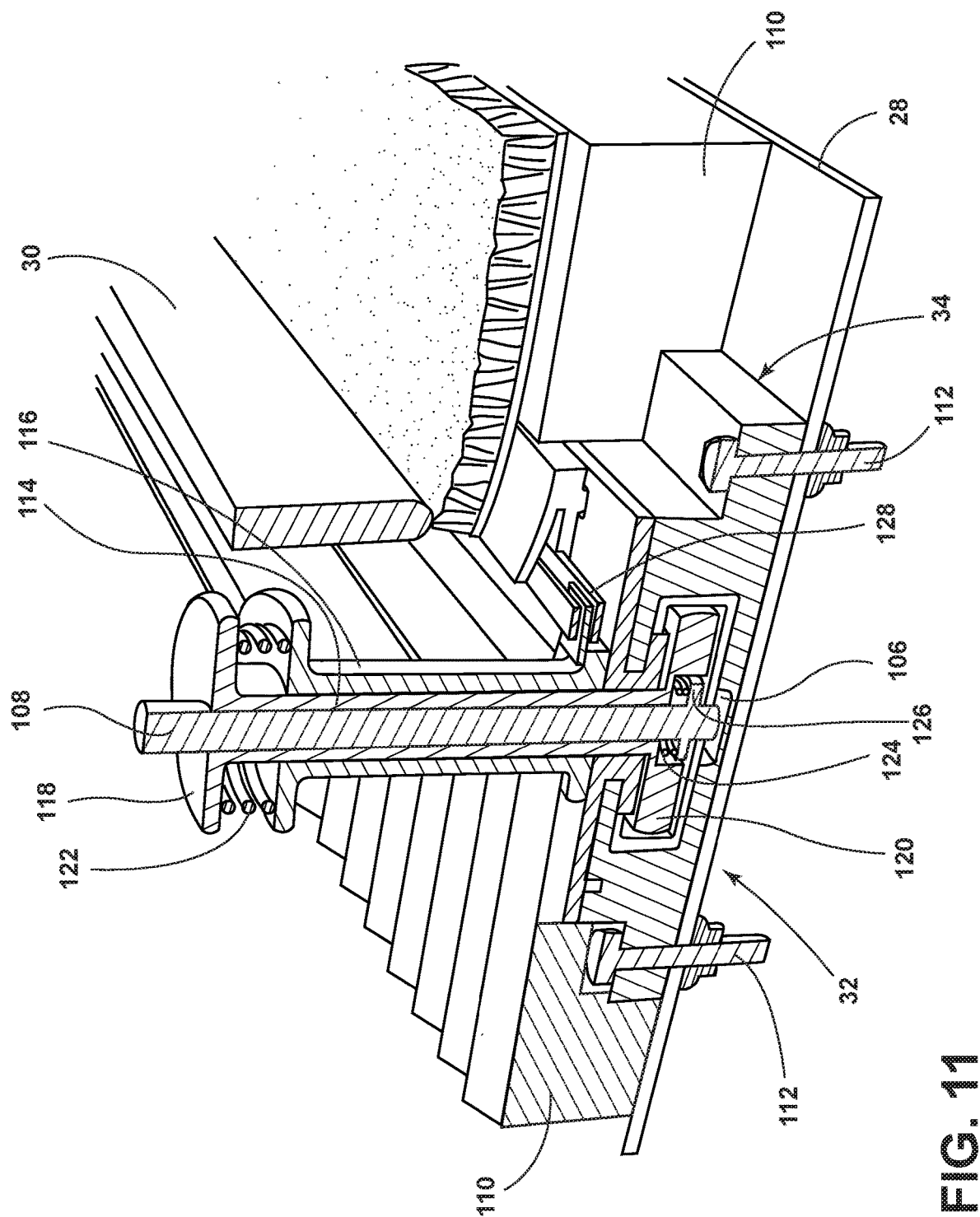
FIG. 11 is an enhanced view of area XI of FIG. 10.
Figure 12:
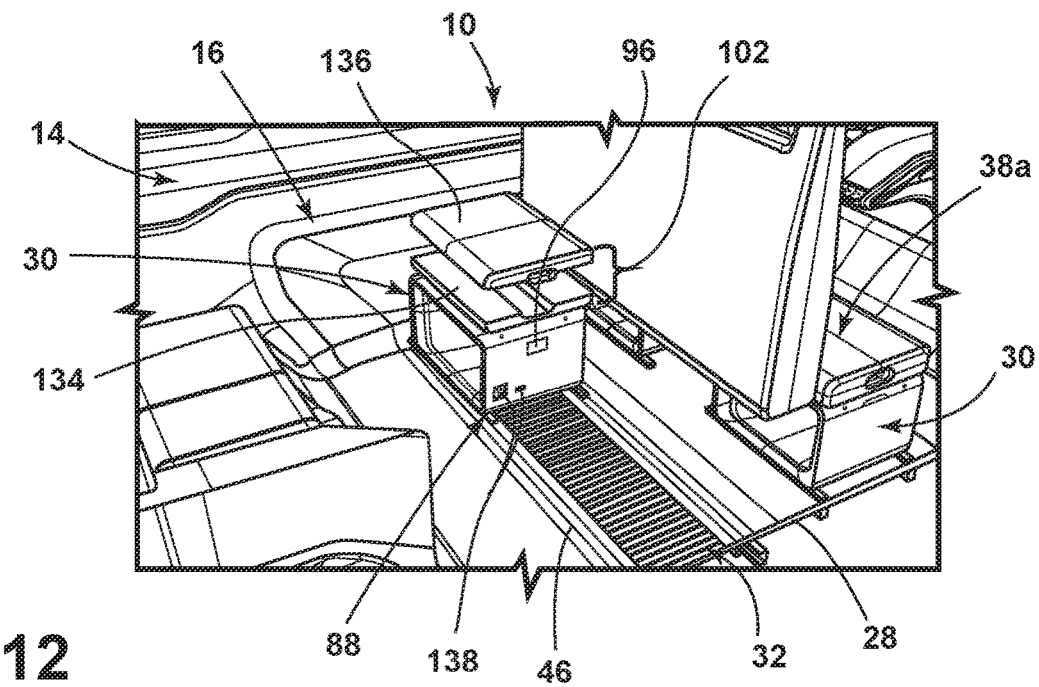
FIG. 12 is a side perspective view of the module operably coupled to the track assembly and an attachment feature partially disposed on the base structure, according to some examples.

Referring now to FIGS. 10 and 11, the floor surface 46 may be separated by a fill layer 110 from the track assembly 32. The floor surface 46 may include any polymeric and/or elastomeric material. The floor surface 46 may also include any fibrous material, such as a carpet. The fill layer 110 may be formed from a material such as foam, a rubber, a cork, a fibrous mat, polymer foam mat, or a polymer sheet. Fibrous mats include those including a combination of cotton fibers and a binder, glass fibers, synthetic resin fibers, natural fibers, and combinations of these. Suitable foam plastic layers include polyethylene, polystyrene, and polyurethane foam, etc.

The rails 34 may be operably coupled to the floor pan 28 by one or more fasteners 112. Alternatively, the rails 34 may be integrally formed with the floor pan 28 and/or any other component of the vehicle 10.

The base structure 68 may conceal the latch 96 such that a user is presented with a smooth and aesthetically pleasing module 30. Additionally, by enclosing the latch 96 within the base structure 68, the latch 96 and the track assembly 32 may be protected from debris. The latch 96 may include a post 114 that is surrounded by a main body 116. In some examples, the post 114 extends above below the main body 116, and in an upper head 118 and a lower head 120. The post 114 surrounds the locking pin 108. The locking pin 108 can be actuated within the post 114 such that the locking pin 108 may be selectively engaged and disengaged with the locking pin apertures 106 of the rails 34.

The latch 96 may be equipped with a first spring 122 that is positioned between the upper head 118 and the main body 116. Additionally, the first spring 122 may act in an upward direction on an underside of the upper head 118 such that the main body 116 of the latch 96 is lifted to suspend the lower head 120 within the rails 34. A second spring 124 may be positioned at a lower region of the locking pin 108. The second spring 124 may be configured to bias the locking pin 108 in a downward direction, for example, to engage with one of the locking pin apertures 106. The second spring 124 may be positioned within the lower head 120 of the post 114. The locking pin 108 may further include a shoulder 126 that engages with an underside of the second spring 124. An upper side of the second spring 124 may engage with the lower head 120 of the post 114. The lower head 120 may define a recessed area in an underside thereof that is configured to receive the second spring 124 and the shoulder 126. At least a portion of the locking pin 108 extends below the lower head 120 such that the locking pin 108 engages with the locking pin apertures 106. The first spring 122 and the second spring 124 may act in opposing directions relative to one another. Said another way, the restorative force of the first spring 122 may oppose the restorative force of the second spring 124.

Referring further to FIGS. 10-13, the locking pin 108 may be actuated by a manual lever or by a powered mechanism that is operably coupled to the locking pin 108. The locking pin 108 may be configured in a generally cylindrical fashion such that the locking pin 108 may be rotated within the rails 34. In some instances, the base structure 68 may include a handle 130 that is configured actuate the latch 96. The handle 130 may be disposed on any portion of the base structure 68 without departing from the scope of the present disclosure.

Referring to FIGS. 12-15, the top portion of the base structure 68 may define one or more attachment points 132 through which a variety of attachment features 104 may be coupled. For example, the attachment feature 104 may be a substrate 134 and a cushion 136 that is configured as an ottoman 36, seat base 40, and/or any other type of furniture. Moreover, the thickness of the substrate 134 and/or the cushion 136 may be varied and/or positionable to account for varied heights. In some instances, the attachment feature 104 may be configured as an adjustable workstation/table that may be vertically and/or horizontally adjustable. Moreover, the attachment feature 104 may include an elongated vertical wall that creates a privacy screen and/or seatback 42 between various seat assemblies 38 within the vehicle 10. Additionally, and/or alternatively, the attachment feature 104 may define an upper shelf for storage above and/or below.

In some examples, the track assembly 32 may provide an electric current to the base structure 68 to provide electronic power for a variety of purposes through one or more electrical conduits 128 (FIG. 11). For example, the base structure 68 may include one or more electronic ports 138, a human-machine interface, and/or controls for any system of the vehicle 10. Additionally and/or alternatively, the powered base structure 68 may also define an enclosed compartment that may be heated and/or chilled for storing food items therein.

Additionally, and/or alternatively, the substrate 134 and the cushion 136 may be elongated to form a bench 140 that is generally wider than a width of the seat assemblies 38 depicted in FIG. 1. In such instances, two portions 142, 144 of the base structure 68 may be separated and support opposing end portions of the attachment feature 104. The separate portions 142, 144 of the base structure 68 may include a retention assembly 146 such that one portion may be coupled to the other. In other examples, the attachment feature 104 may attach to both portions 142, 144 of the base structure 68 and thereby maintain each component in position relative one another. Similarly, in some examples, each portion of the base may include the latch 96 thereon for maintaining that portion of the base structure 68 in position. Alternatively, the latch 96 may be disposed on one portion of the base structure 68 and the attachment feature 104 may retain the remaining portions 142, 144 of the base structure 68 in position.

Use of the present disclosure may offer a variety of advantages. For instance, use of the one or more modules provided herein allows for varied passenger environments. The modules may be selectively moved and/or removed from the vehicle. In some instances, the modules may be configured to accept various attachment features thereon to provide a variety of additional functional elements to the vehicle while minimizing cost of each individual feature.

According to various examples, a vehicle module system is provided herein and includes a base structure defining an attachment point. A rail feature is disposed along a bottom portion of the base structure. An attachment feature has a retainer for removably coupling to the attachment point. Examples of the vehicle module system can include any one or a combination of the following features:

the rail feature is removably coupled with a track assembly;

a latch disposed within the base structure and configured to selectively maintain the base structure in a locked position;

a locking pin within the latch and configured to selectively be disposed within a locking aperture;

the track assembly includes a first pair of rails extending in a latitudinal direction through a passenger compartment;

the attachment feature is configured as a seat assembly;

the base structure includes first and second separable portions and the attachment feature extends above the first and second portions in a separated state;

the attachment feature includes a seatback and a pair of seat bases extending from opposing sides of the seatback;

the base structure includes one or more powered electronic ports;

a top structure operably coupled to the attachment point, the top structure including one or more peripheral walls extending upwardly therefrom; and/or a guide disposed between the pair of rails and disposed along a floor structure of the vehicle, the guide defining a plurality of teeth.

According to some examples, a method of manufacturing a vehicle module system. The method includes forming a base structure defining an attachment point. The method also includes coupling a rail feature along a bottom portion of the base structure. Lastly, the method includes positioning an attachment feature having a retainer to the attachment point.

According to some examples, a vehicle module system is provided herein. The vehicle module system includes a base structure defining a first upper attachment point and a second peripheral attachment point. A rail feature is disposed along a bottom portion of the base structure. First and second attachment features are operably coupled and supported by the respective first and second attachment points. Examples of the vehicle module system can include any one or a combination of the following features:

the base structure includes first and second separable portions configured to support one or more attachment features of varying width;

the first or second attachment feature a seatback and a pair of seat bases extending from opposing sides of the seatback;

the first or second attachment feature forms a privacy wall between proximately disposed seat assemblies; and/or the base structure includes a latch for releasably retaining the base structure in a predetermined position.

According to other examples, a vehicle is disclosed. The vehicle includes a body defining a passenger compartment. A track assembly is operably coupled with the body and oriented in a latitudinal direction. One or more modules are removably and slidably coupled with the track assembly. Examples of the vehicle can include any one or a combination of the following features:

the one or more modules include a base structure and a rail feature coupled to the base structure;

the track assembly includes a plurality of rails that terminate at a vehicle opening; and/or the base structure includes first and second separable portions configured to support one or more attachment features of varying width.

It will be understood by one having ordinary skill in the art that construction of the described invention and other components are not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage units, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage units, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage units.

Further, where appropriate, functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It will be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It will be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle comprising:
  a first track assembly comprising a first pair of parallel rails;
  a first module operably coupled to the first pair of parallel rails;
  a first seat cushion disposed on top of the first module and configured to provide seating for a forward-facing occupant;
  a second track assembly comprising a second pair of parallel rails disposed rearward of the first track assembly;
  a second module operably coupled to the second pair of rails;
  a second seat cushion disposed on top of the second module and configured to provide seating for a rearward-facing occupant;
  a floor surface, wherein the first pair of parallel rails and the second pair of parallel rails are disposed lower than the floor surface; and a seatback assembly common to both the first seat cushion over the first module and the second seat cushion over the second module, the seatback assembly disposed longitudinally between the first module and the second module.

2. The vehicle of claim 1, wherein
each rail of the first pair of parallel rails and the second pair of parallel rails defines a channel;
the first module comprises a rail feature that is disposed within one of the channels of the first pair of parallel rails; and
the second module comprises a rail feature that is disposed within one of the channels of the second pair of parallel rails.

3. The vehicle of claim 1, wherein
one of the parallel rails of the first track assembly further includes a channel and a plurality of locking pin apertures;
one of the parallel rails of the second track assembly further includes a channel and a plurality of locking pin apertures;
the first module comprises a rail feature that is disposed within the channel of the first track assembly and a locking pin that can be actuated to selectively engage or disengage with the plurality of locking pin apertures of the first track assembly; and
the second module comprises a rail feature that is disposed within the channel of the second track assembly and a locking pin that can be actuated to selectively engage or disengage with the plurality of locking pin apertures of the second track assembly.

4. The vehicle of claim 3, wherein
the locking pin of the first module extends through the rail feature of the first module; and
the locking pin of the second module extends through the rail feature of the second module.

5. The vehicle of claim 1, wherein the first pair of parallel rails and the second pair of parallel rails extend latitudinally.

6. The vehicle of claim 1, wherein
the first module and the second module each comprise a bottom portion, an upper portion, and two opposing sidewalls extending between the bottom portion and the upper portion.

7. The vehicle of claim 1, wherein the second module comprises an electronic port.

8. The vehicle of claim 1, wherein
the first module and the second module each comprise a bottom portion, an upper portion, and two opposing sidewalls extending between the bottom portion and the upper portion, together forming a longitudinally extending cavity.

9. The vehicle of claim 8, wherein the second module is aligned rearward of the first module, and the opposing sidewalls of the first module are generally coplanar with the opposing sidewalls of the second module.

10. The vehicle of claim 3, wherein
the rail feature of the first module comprises a cylinder through which the locking pin extends, the cylinder including an outwardly extending circular flange, a portion of which flange is disposed within the channel of one of the rails of the first track assembly and rests upon the rail, with the locking pin extending downward from the cylinder into one of the plurality of apertures of the first track assembly; and
the rail feature of the second module comprises a cylinder through which the locking pin extends, the cylinder including an outwardly extending circular flange, a portion of which flange is disposed within the channel of one of the rails of the second track assembly and rests upon the rail, with the locking pin extending downward from the cylinder into one of the plurality of apertures of the second track assembly.

11. The vehicle of claim 3, wherein
the first module further comprises a handle operably coupled to the locking pin to actuate the locking pin to selectively engage or disengage with the plurality of locking pin apertures of the first track assembly; and
the second module further comprises a handle operably coupled to the locking pin to actuate the locking pin to selectively engage or disengage with the plurality of locking pin apertures of the second track assembly.

12. The vehicle of claim 1, wherein
the seatback assembly extends lower than the first seat cushion over the first module, and lower than the second seat cushion of the second module.

13. The vehicle of claim 5 further comprising:
a third track assembly including a third pair of parallel laterally extending rails, the third pair of parallel laterally extending rails disposed co-linearly with the first pair of parallel laterally extending rails and forward of the second track assembly; and
a third module releasably coupled with the third pair of parallel laterally extending rails.

14. The vehicle of claim 13 further comprising:
the second module is aligned rearward behind the third module.

15. The vehicle of claim 13,
the second module is positioned latitudinally between the first module and the third module.

* * * * *